(12) United States Patent
Childs et al.

(10) Patent No.: US 11,013,179 B1
(45) Date of Patent: May 25, 2021

(54) HYBRID DRAPER BELT SPLICE

(71) Applicant: CNH Industrial America LLC, New Holland, PA (US)

(72) Inventors: Albert Wayne Childs, Denver, PA (US); Cory Douglas Hunt, Millersville, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/737,272

(22) Filed: Jan. 8, 2020

(51) Int. Cl.
| | |
|---|---|
| *A01D 61/02* | (2006.01) |
| *F16G 3/06* | (2006.01) |
| *B65G 15/56* | (2006.01) |
| *F16G 3/04* | (2006.01) |
| *A01D 61/00* | (2006.01) |

(52) U.S. Cl.
CPC ........... *A01D 61/02* (2013.01); *A01D 61/002* (2013.01); *B65G 15/56* (2013.01); *F16G 3/04* (2013.01); *F16G 3/06* (2013.01); *B65G 2201/0202* (2013.01)

(58) Field of Classification Search
CPC ...... A01D 61/02; A01D 61/002; B65G 15/56; F16G 3/04; F16G 3/06
See application file for complete search history.

(56) References Cited

U.S. PATENT DOCUMENTS

| | | | | |
|---|---|---|---|---|
| 1,220,795 | A | * | 3/1917 | Stone ................. F16G 3/06 24/37 |
| 1,235,656 | A | | 8/1917 | Cobb |
| 1,565,074 | A | * | 12/1925 | Erskine ................. F16G 3/06 24/37 |
| 2,883,871 | A | * | 4/1959 | Poeschl ................. F16G 3/08 474/257 |
| 6,238,131 | B1 | | 5/2001 | Watts et al. |
| 7,344,020 | B2 | | 3/2008 | Grywacheski et al. |
| 7,661,256 | B2 | | 2/2010 | Coers et al. |
| 7,690,500 | B2 | | 4/2010 | Coers et al. |
| 7,730,709 | B2 | | 6/2010 | Priepke |
| 8,151,547 | B2 | | 4/2012 | Bich et al. |

FOREIGN PATENT DOCUMENTS

JP         2004338868  A       12/2004

\* cited by examiner

*Primary Examiner* — William R Harp
(74) *Attorney, Agent, or Firm* — Patrick Sheldrake; Peter Zacharias (57) ABSTRACT

The subject disclosure includes structure for easily and reliably connecting and disconnecting first and second ends of an agricultural harvester draper belt. A unitary hairpin connecting bar enables connection of adjacent flanges of the first and second ends of the draper belt. A plurality of connecting bar pairs provide connection of adjacent flanges of the first and second ends of the draper belt when the flanges are arranged in an angled, stepped or staggered pattern. A flexible connecting bar pair provides connection to flanges at the first and second ends of the draper belt that extend at a non-perpendicular angle relative to the leading edge of the draper belt.

12 Claims, 6 Drawing Sheets

HYBRID DRAPER BELT SPLICE

The exemplary embodiments of present invention relate generally to a header of a plant cutting machine (e.g., a combine harvester) and, more specifically, to a splice for splicing the leading and trailing ends of a header draper conveyor belt.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally inside the header.

A conventional method for coupling or splicing the leading and trailing ends of a draper belt typically employs a pair of rigid connecting bars that fasten together to provide a clamping force against upstanding belt flaps or flanges provided at the leading and trailing ends of a draper belt. The connecting bars have through holes that are aligned with one another and with holes in the belt flanges. Fasteners such as threaded bolts pass through the holes of one connecting bar and the holes provided in the upstanding flanges and thereafter through the holes of the other connecting bar, whereupon they receive nuts which are tightened to provide clamping force on the belt flanges. However, with this method it is difficult to align the series of holes between all of the pieces. Furthermore, the connecting bars are oftentimes deformed and must be bent back to alignment. This method also creates poor sealing at the edges of the belt as the connecting bars are too bulky to extend to the edges of the belt which are covered by debris shields/seals.

Another current construction method involves a laced splice at the leading and trailing ends of the draper belt which involves time consuming lacing of the ends of the draper belt. Still another construction involves the use of a fixed length, endless draper belt. However, endless belts are challenging to install.

BRIEF SUMMARY OF THE INVENTION

In accordance with an exemplary embodiment there is provided a draper belt for an agricultural harvester header comprising a first end having a first flange, and a second end opposite the first end having a second flange. The draper belt further comprises a splice for joining together the first and second ends. The splice includes a unitary hairpin connecting bar for circumscribing and joining together the first and second flanges. The unitary hairpin connecting bar includes a fastener for connecting to the first and second flanges.

In accordance with another exemplary embodiment there is provided a draper belt for an agricultural harvester header comprising a first end having a first plurality of spaced apart flanges, and a second end opposite the first end having a second plurality of spaced apart flanges. A splice assembly joins the first and second ends. The splice assembly includes a plurality of connecting bar pairs connecting one of the first plurality of spaced apart flanges to an adjacent one of the second plurality of spaced apart flanges.

In accordance with yet another exemplary embodiment there is provided a draper belt for an agricultural harvester header comprising a first end having a first flange extending at a non-perpendicular angle relative to a leading edge of the draper belt, and a second end opposite the first end having a second flange extending at a non-perpendicular angle relative to the leading edge of the draper belt. The opposite first and second ends are joined together by splice that includes a fore edge end joined together via a flat belt splice, an aft edge end joined together via a flat belt splice, and a connecting bar pair connecting the first flange to the second flange.

Advantages arising from the various exemplary embodiments include structure for easily and reliably connecting and disconnecting first and second ends of an agricultural harvester draper belt. For example, a unitary hairpin connecting bar enables connection of adjacent flanges of the first and second ends of the draper belt. Further, a plurality of connecting bar pairs provide connection of adjacent flanges of the first and second ends of the draper belt when the flanges are arranged in an angled, stepped or staggered pattern. Furthermore, a flexible connecting bar pair provides connection to flanges at the first and second ends of the draper belt that extend at a non-perpendicular angle relative to the leading edge of the draper belt.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
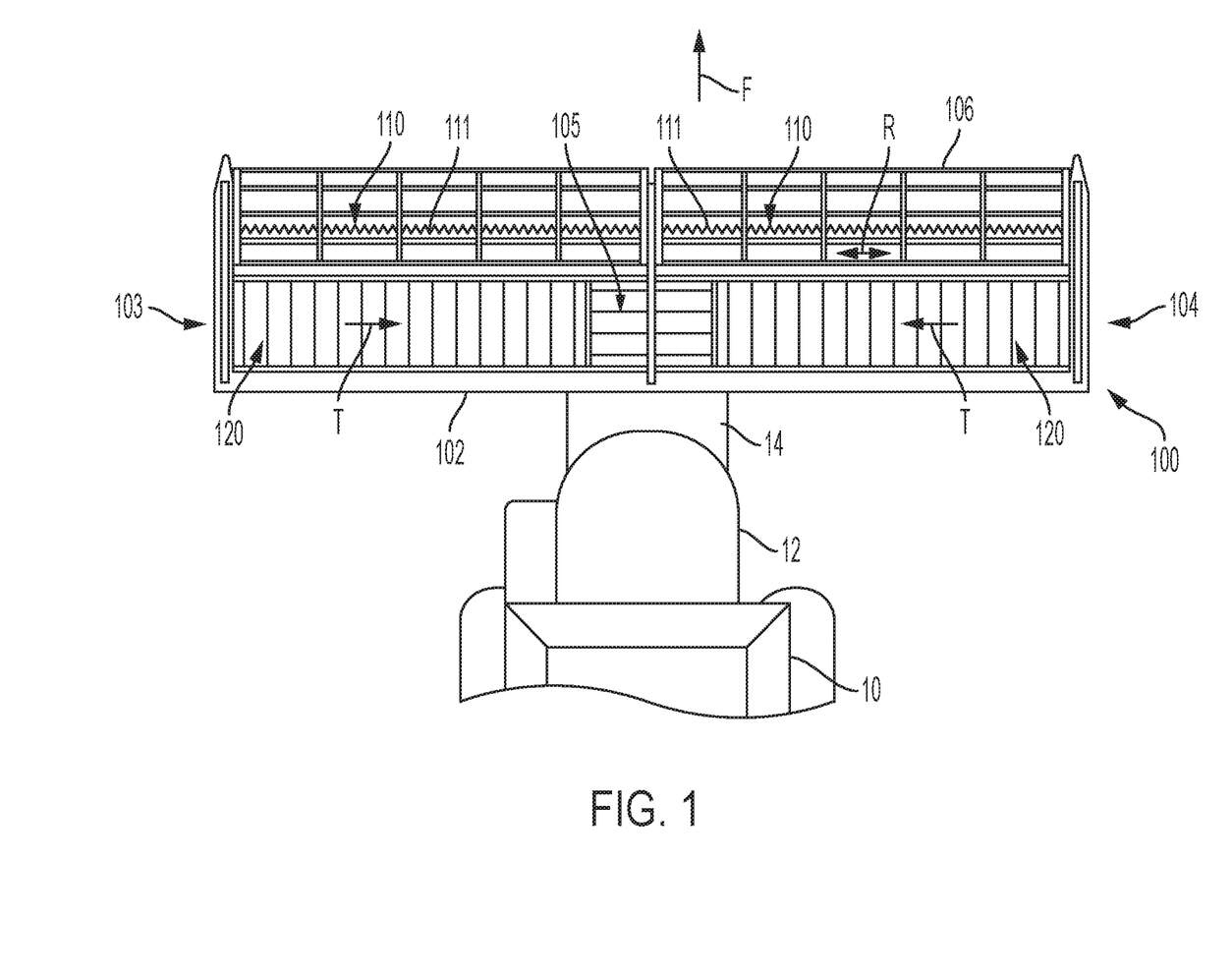
FIG. 1 is a top view of an agricultural vehicle in the form of a combine harvester in accordance with the subject disclosure.

Referring now to the drawings, and more particularly to FIG. 1, there is shown an exemplary embodiment of an agricultural vehicle 10 in the form of, e.g., a combine harvester which generally includes a chassis 12, a feeder housing or feederhouse 14, and an attachment in the form of a header 100. Typically, the combine harvester 10 will include additional internal systems for the separation and handling of collected crop material. However, these additional systems are not essential for a full and proper understanding of the subject disclosure. It should be appreciated that the draper belt described and illustrated herein does not necessarily need to be included on combine harvesters, but can be incorporated in other agricultural vehicles or devices having draper belts.

The header 100 is coupled to, and therefore supported by, the chassis 12 of the agricultural vehicle 10 by, for example, coupling to the feeder housing 14. In the exemplary embodiment shown, the header 100 is in the form of a draper header to harvest bushy or fluffy crop material. The draper header 100 has a frame 102 coupled to the chassis 12 by coupling to the feeder housing 14 and a pair of opposed lateral ends 103, 104. The draper header 100 may support one or more flexible cutter bar assemblies 110 with reciprocating knives 111 to cut crop material as the agricultural vehicle 10 travels in a forward direction, denoted by arrow F. The reciprocating knives 111, which may be referred to as cutting elements, can be reciprocated back-and-forth in a lateral direction, denoted by arrow R, relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The draper header 100 may further include a center feed belt 105 or a center auger that conveys the crop material into the feeder housing 14. The draper header 100 may also include one or more lateral, flexible draper belts 120 that are positioned rearwardly of the cutter bar assemblies 110 and travel, i.e. rotate, in opposing directions of travel, denoted by each arrow "T", in order to convey crop material inwardly to the center feed belt 105 and thereby the feeder housing 14. The header 100 may also include a rotating reel 106 with tines or the like to sweep the crop material inwardly towards the draper belts 120.

Figure 2A:
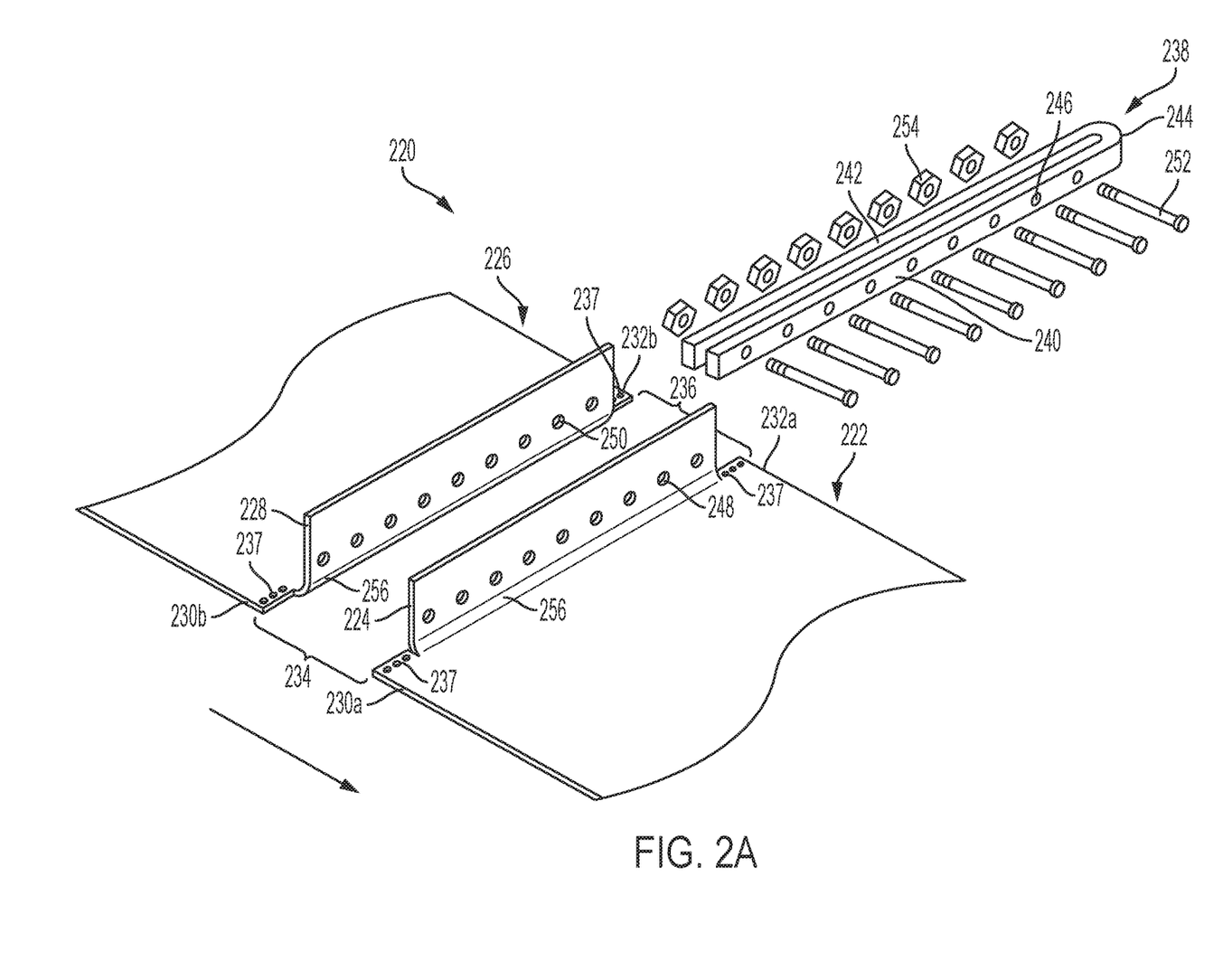
FIG. 2A is an exploded perspective view of a portion of the draper belt for an agricultural harvester header in accordance with an exemplary embodiment of the subject disclosure.

Referring to FIG. 2A, there is shown, in exploded view, a portion of a first exemplary embodiment of a draper belt 220 for an agricultural harvester constructed in accordance with the subject disclosure. The draper belt 220 includes a first end 222 having a first flange 224, and a second end 226 opposite the first end 222 and having a second flange 228. The first and second flanges 224, 228 are positioned so as to be upstanding flanges. The first and second flanges 224, 228 can be upstanding flanges which are connected to their respective belt ends 222, 226 by a living hinge 256.

Figure 2B:
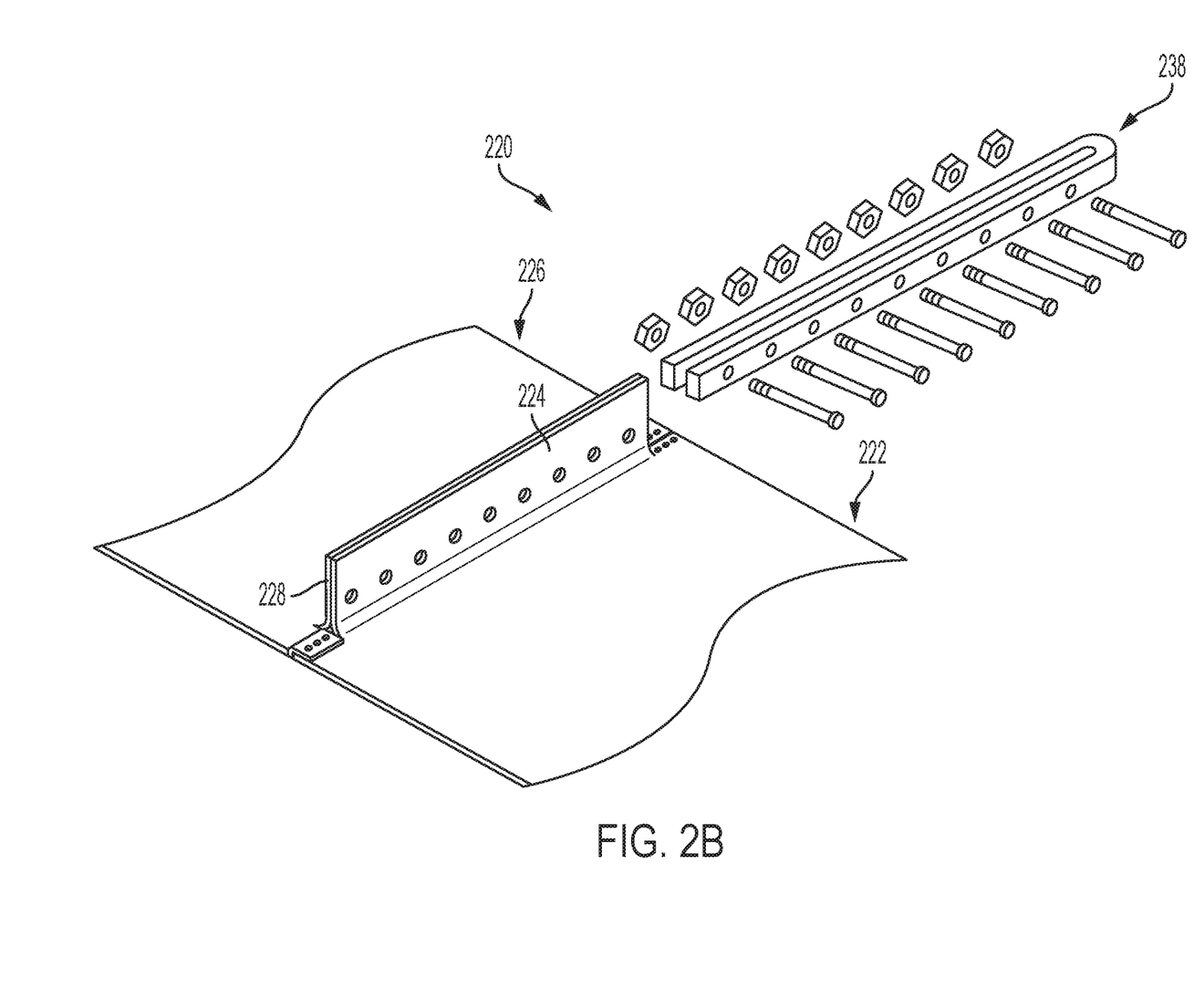
FIG. 2B is another exploded perspective view of the draper belt of FIG. 2A.

The opposite first and second ends 222, 226 are joined together forming a splice of the draper belt. The splice includes a leading edge 230a and a trailing edge 230b joined together via a first flat belt splice 234, and another leading edge 232a and another trailing edge 232b joined together via a second flat belt splice 236 that is spaced from the first flat belt splice 234. The flat belt splices 234, 236 are secured, e.g., by coupling them together in abutting or overlapping (FIG. 2B) relation. For example, coupling of the flat belt splices can be achieved by embedding toothed sections of opposed looped connectors in holes 237 and passing a rod through the connector loops to interlock the loops and create the flat belt splices 234, 236. The splices 234, 236 can alternatively be secured by other suitable connectors including, without limitation, flat metal links fastened to abutted ends of the belt.

The splice further includes a unitary hairpin connecting bar 238 configured as shown in FIG. 2. The unitary hairpin connecting bar circumscribes and joins together the first and second flanges 224, 228, such that the flanges are within the unitary hairpin connecting bar. The unitary hairpin connecting bar 238 comprises a pair of closely spaced apart legs 240, 242 joined at first ends thereof by a substantially U-shaped juncture 244. The unitary hairpin connecting bar 238 includes at least one through hole 246 in leg 240 which is aligned with a corresponding through hole (not shown) in leg 242 and alignable with a through hole 248 provided in the first flange 224 and a corresponding through hole 250 provided in the second flange 228.

The unitary hairpin connecting bar 238 also includes a fastener 252 for connecting to the first and second flanges 224, 228 by respective insertion into through hole 246, through hole 248, through hole 250, and the unillustrated through hole in leg 242 of bar 238. The fastener 252 may be formed as a rivet, nut and bolt, or the like. However, to enable easy disconnection of the unitary hairpin connecting bar 238 from the first and second flanges 224, 228, fastener 252 is constructed as a screw- or bolt-type threaded fastener which engages corresponding threading provided in the unillustrated through hole in leg 242 of bar 238 or a nut-type threaded fastener 254. According to an aspect, the unitary hairpin connecting bar may include a plurality of fasteners corresponding in number to a plurality of through holes in the leg of the unitary hairpin connecting bar 238, a plurality of through holes provided in the first flange 224, and a plurality of through holes provided in the second flange 228, which are spaced apart along the width of the flanges 224, 228 and along the length of the legs 240, 242 of the unitary hairpin connecting bar 238. In other words, in the flanges and the unitary hairpin connecting bar are alignable with one another to receive respective fasteners 252.

Figure 3:
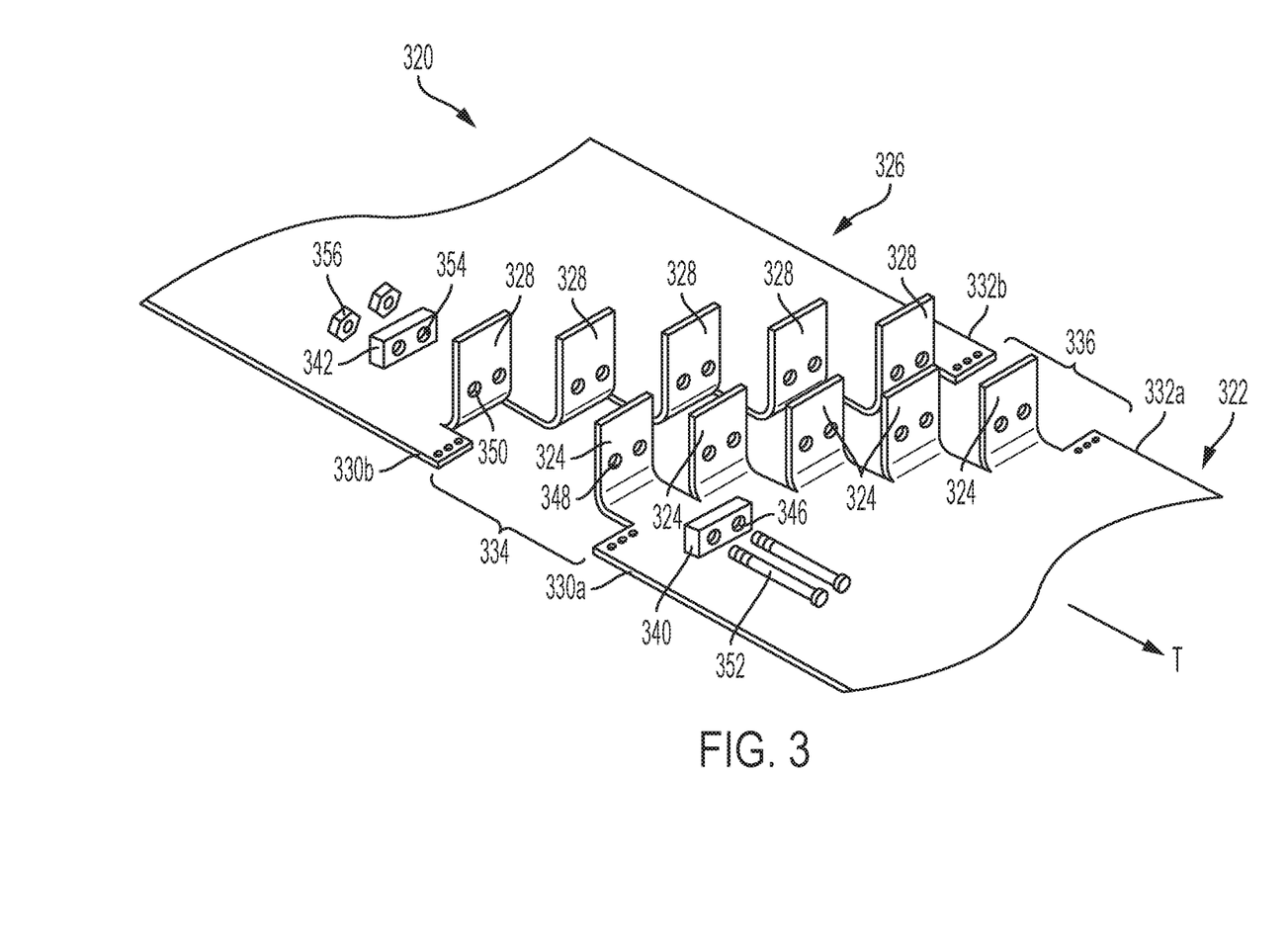
FIG. 3 is an exploded perspective view of a portion of a draper belt for an agricultural harvester header in accordance with another exemplary embodiment of the subject disclosure.

Referring to FIG. 3, there is shown, in exploded view, a portion of another exemplary embodiment of a draper belt 320 for an agricultural harvester constructed in accordance with the subject disclosure. The draper belt 320 includes a first end 322 having a first plurality of spaced apart flanges 324, and a second end 326 opposite the first end having a second plurality of spaced apart flanges 328. The opposite first and second ends 322, 326 are joined together by a splice assembly. The splice assembly includes a leading edge 330*a* joined to a trailing edge 330*b* to form a flat belt splice 334. Likewise, another leading edge 332*a* is joined to another trailing edge 332*b* to form a flat belt splice 336. The flat belt splices 334, 336 may be achieved, e.g., coupling together the flat belt splices in abutting or overlapping relation.

The splice assembly further includes a plurality of connecting bar pairs 340, 342 connecting one of the first plurality of spaced apart flanges 324 to an adjacent one of the second plurality of spaced apart flanges 328. The second plurality of spaced apart flanges 328 is arranged in a complementary fashion to the first plurality of spaced apart flanges 324. According to an aspect, the first plurality of flanges 324 includes at least two flanges and the second plurality of flanges 328 includes at least two flanges.

Figure 3A:
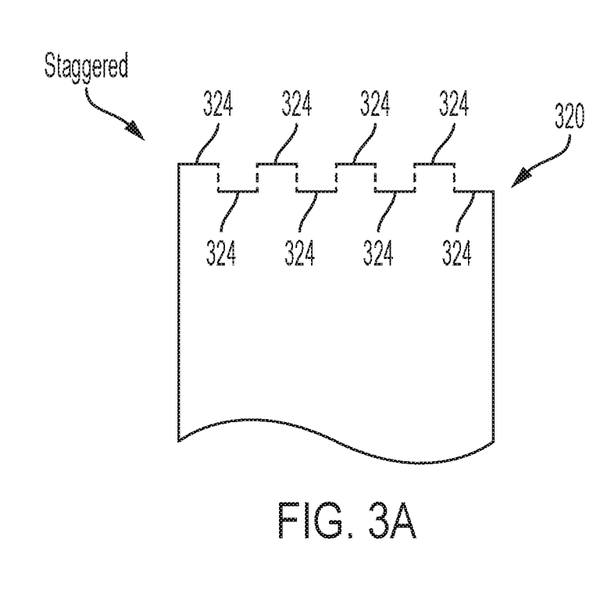
FIG. 3A is a partial schematic plan view of a draper belt showing a staggered arrangement of connecting bar pairs and belt end flanges of a draper belt in accordance with an exemplary embodiment of the subject disclosure.
Figure 3B:
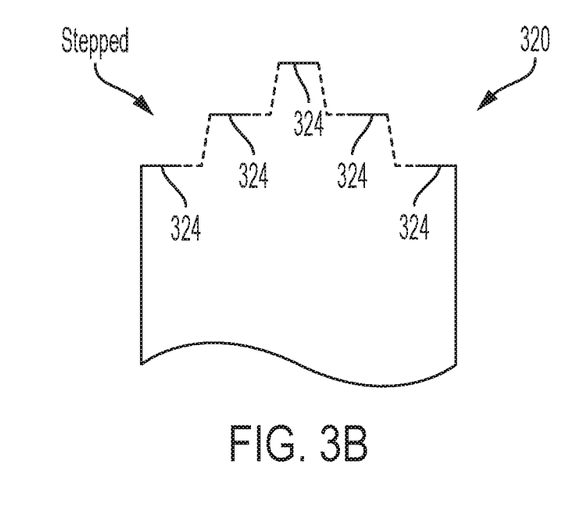
FIG. 3B is a partial schematic plan view of a draper belt showing a stepped arrangement of connecting bar pairs and belt end flanges of a draper belt in accordance with an exemplary embodiment of the subject disclosure.

As shown in FIG. 3, in accordance with an aspect of the subject disclosure, the spaced apart flanges 324, 328 are arranged along an angle transverse to the direction of travel T or a longitudinal axis of the draper belt 320. Alternatively, as shown schematically in FIG. 3A, the first plurality of spaced apart flanges is arranged in a stepped pattern or as shown in FIG. 3B, the first plurality of spaced apart flanges is arranged in a staggered pattern.

Referring back to FIG. 3, each of the plurality of connecting bar pairs 340, 342 includes a fastener 352 for connecting together one of the first plurality of flanges 324 and one of the second plurality of flanges 328. In this regard, connection is achieved by insertion of the fastener 352 into a through hole 346 in a first bar 340 of the plurality of connecting bar pairs 340, 342, a through hole 348 in one of the first plurality of flanges 324, a through hole 350 in one of the second plurality of flanges 328, and a through hole 354 in a second bar 342 of the plurality of connecting bar pairs 340, 342. The fastener 352 may be formed as a rivet, nut and bolt, or the like. However, to enable easy disconnection of the connecting bar pairs 340, 342 from the first and second flanges 324, 328, fastener 352 may be constructed as a screw- or bolt-type threaded fastener which engages corresponding threading provided in the through hole 354 in the second bar 342 of the plurality of connecting bar pairs 340, 342 or in a nut-type threaded fastener 356. In sum, there is provided a fastener 352, 356 corresponding to a pair of through holes in the first bar of the plurality of connecting bar pairs, a pair of through holes provided in one of the first plurality of flanges, a pair of through holes provided in one of the second plurality of flanges, and a pair of through holes in the second bar of the plurality of connecting bar pairs. In other words, individual pairs of through holes on the connecting bars first and second plurality of flanges are alignable with one another to receive a fastener.

It is to be understood that the construction illustrated in FIG. 3 is not limited to a plurality of connecting bar pairs 340, 342 for joining opposed first and belt second flanges 324, 328 together. In this regard, a plurality of unitary hairpin connecting bars similar to but shorter than the unitary hairpin connecting bar 238 of FIG. 2 may be used instead of the plurality of connecting bar pairs.

Figure 4:
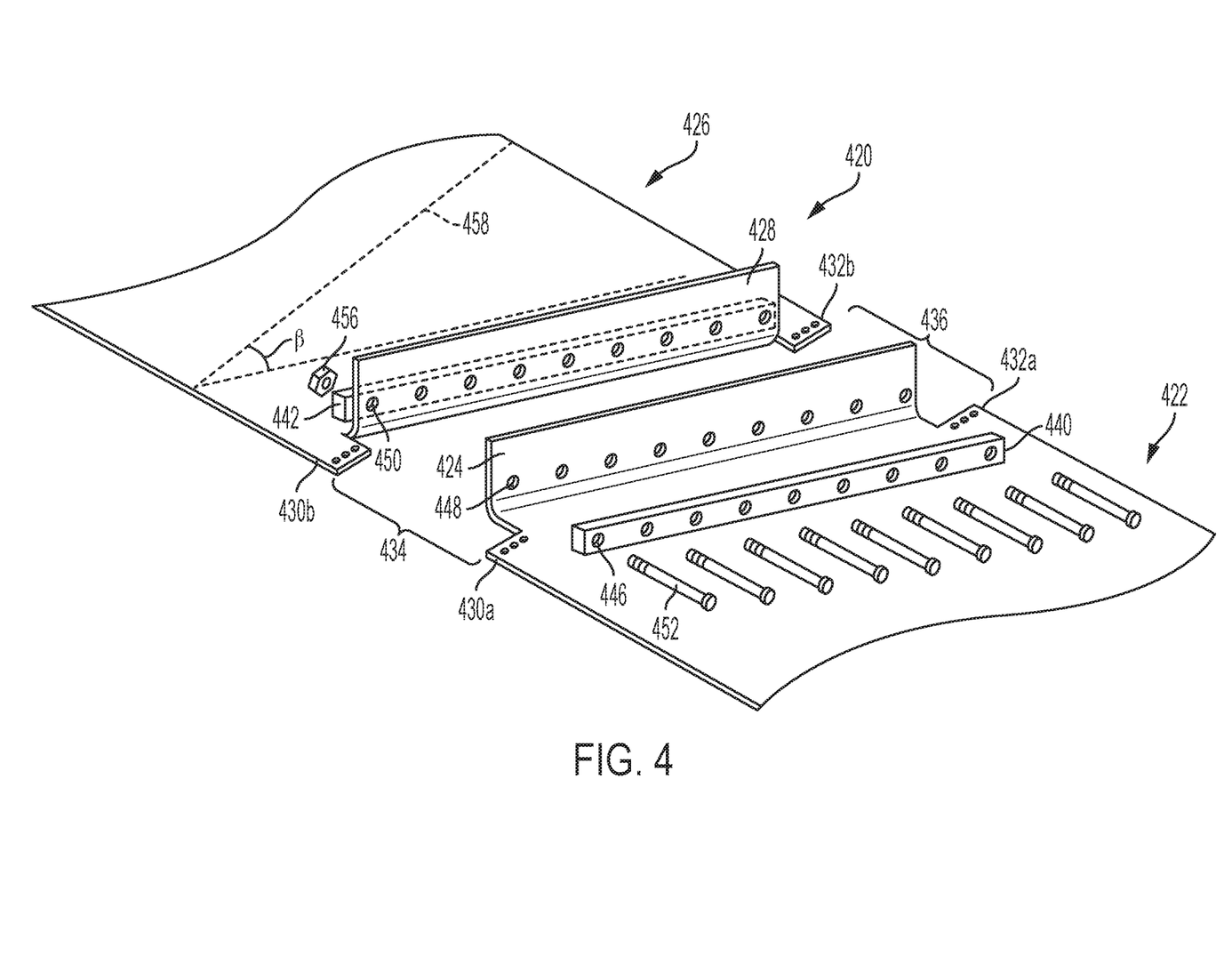
FIG. 4 is an exploded perspective view of a portion of a draper belt for an agricultural harvester header in accordance with another exemplary embodiment of the subject disclosure.

Referring to FIG. 4, there is shown, in exploded view, a portion of another exemplary embodiment of a draper belt 420 for an agricultural harvester constructed in accordance with the subject disclosure. The draper belt 420 includes a first end 422 having a first flange 424 extending at a non-perpendicular angle of about 5 to 75 degrees relative to a leading end of the draper belt (or about 15 to 85 degrees relative to a front edge of the belt), and a second end 426 opposite the first end 422 having a second flange 428 extending at a corresponding non-perpendicular angle β of about 45 degrees, but can alternatively be about 5, 10, 20, 30, 40, 50, 60, 70, or 75 degrees relative to a trailing end 458 of the draper belt. The opposite first and second ends 422, 426 are joined together by a splice. The splice includes a fore end 430*a*, 430*b* joined together via a flat belt splice 434, and an aft end 432*a*, 432*b* joined together via a flat belt splice 436. The flat belt splices 434, 436 may be achieved by any suitable methods including, without limitation, coupling together the fore end 430*a*, 430*b* and the aft end 432*a*, 432*b* in abutting or overlapping relation.

The splice further includes a connecting bar pair 440,442 connecting the first flange 424 to the second flange 428. Each bar of the connecting bar pair 440, 442 may be, e.g., a unitary connecting bar that extends substantially the entire length of the first or second flange 424, 428. The connecting bar pair is flexible and includes a fastener 452 for connecting to the first and second flanges 424, 428. Suitable flexible materials for forming the connecting bar pair 440, 442 may include, e.g., a polymer such as rubber or an elastomer. Alternatively, composite materials such as fiber glass, carbon fiber, spring steel and the like may also be used. In addition, segmented rigid materials, e.g., chains, embedded in rubber or polymer would form a seamless flexible structure suitable for use as the flexible connecting bar pair.

Connection of the assembly is achieved by insertion of the fastener 452 into a through hole 446 in a first bar 440 of the connecting bar pair 440, 442, a through hole 448 of the first flange 424, a through hole 450 of the second flange 428, a corresponding through hole in a second bar 442 of the connecting bar pair 440, 442. Fastener 452 may be formed as a rivet or the like. However, to enable easy disconnection of the connecting bar pair 440, 442 from the first and second flanges 424, 428, fastener 452 may be constructed as a screw- or bolt-type threaded fastener which engages corresponding threading provided in the through hole in the second bar 442 of the connecting bar pair 440, 442 or in a nut-type threaded fastener 456. According to an aspect, there is provided a plurality of fasteners corresponding to a plurality of through holes in the first bar of the connecting bar pair, a plurality of through holes provided in the first flange, a plurality of through holes provided in the second flange, and a plurality of through holes in the second bar of the connecting bar pair. In other words, through holes in the flanges and the bars of the bar pair are alignable with one another to receive respective fasteners.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A draper belt for an agricultural harvester header comprising:
   a first end having a first plurality of spaced apart flanges;
   a second end opposite the first end having a second plurality of spaced apart flanges; and
   a splice assembly for joining the first and second ends, the splice assembly including:
      a plurality of connecting bar pairs or unitary hairpin connecting bars for connecting one of the first plurality of spaced apart flanges to an adjacent one of the second plurality of spaced apart flanges.

2. The draper belt of claim 1, wherein the first plurality of spaced apart flanges is arranged in a stepped or staggered pattern.

3. The draper belt of claim 1, wherein the second plurality of spaced apart flanges is arranged in a complementary fashion to the first plurality of spaced apart flanges.

4. The draper belt of claim 1, wherein the first plurality of flanges includes at least two flanges and the second plurality of flanges includes at least two flanges.

5. The draper belt of claim 1, wherein each of the plurality of connecting bar pairs or unitary hairpin connecting bars includes a fastener for connecting one of the first plurality of flanges to one of the second plurality of flanges.

6. The draper belt of claim 1, wherein the splice assembly further comprises a first flat belt splice for joining together a leading edge of one of the first and second ends with a trailing edge of the other of the first and second ends.

7. A draper belt for an agricultural harvester header comprising:
   a first end having a first flange extending at a non-perpendicular angle relative to a leading edge of the draper belt; and
   a second end opposite the first end having a second flange extending at a non-perpendicular angle relative to a trailing edge of the draper belt, wherein the opposite first and second ends are joined together by a splice that includes:
      a fore end joined together via a flat belt splice,
      an aft end joined together via a flat belt splice, and
      a connecting bar pair connecting the first flange to the second flange.

8. The draper belt of claim 7, wherein the connecting bar pair is a unitary connecting bar.

9. The draper belt of claim 8, wherein each bar of the connecting bar pair extends substantially the entire length of the first or second flange.

10. The draper belt of claim 7, wherein the connecting bar pair is flexible.

11. The draper belt of claim 7, wherein the connecting bar pair includes a fastener for connecting to the first and second flanges.

12. The draper belt of claim 7, wherein the non-perpendicular angle is about 5 to 75 degrees.

* * * * *